J. SCOTT.
WIND SHIELD WIPER.
APPLICATION FILED JAN. 14, 1916.
1,191,349.
Patented July 18, 1916.
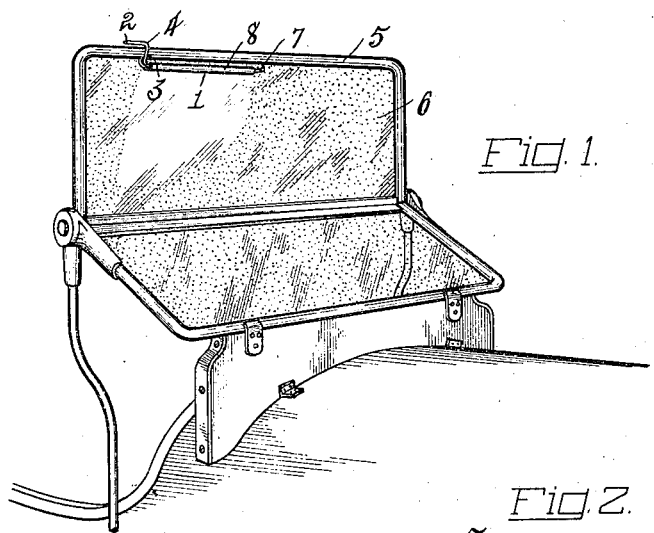
Fig. 1.
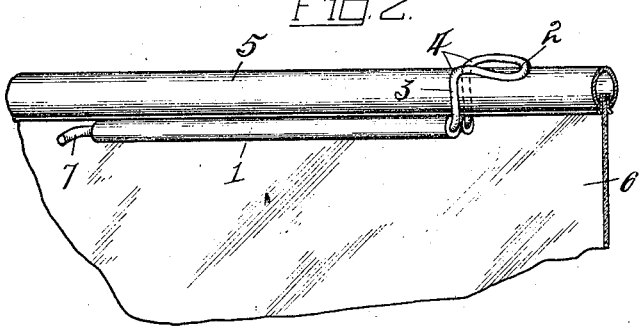
Fig. 2.
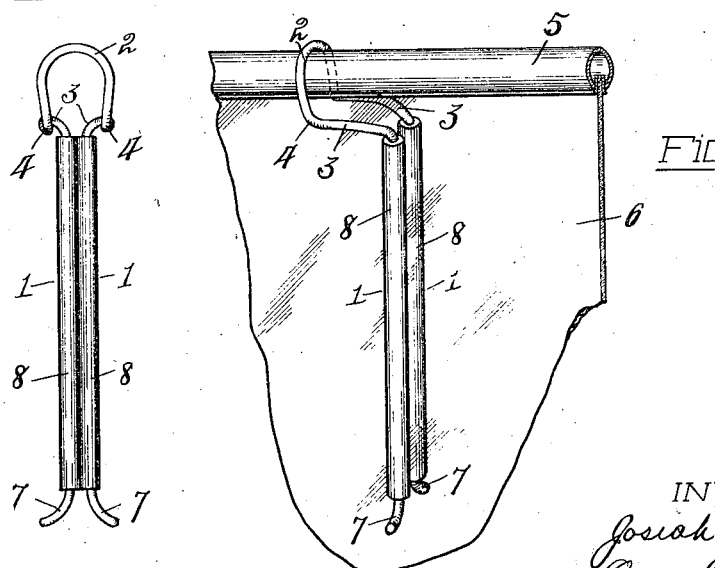
Fig. 4.
Fig. 3.
INVENTOR
Josiah Scott,
By Owen, Owen & Crampton,
His attys.

UNITED STATES PATENT OFFICE.

JOSIAH SCOTT, OF TOLEDO, OHIO.

WIND-SHIELD WIPER.

1,191,349.   Specification of Letters Patent.   Patented July 18, 1916.

Application filed January 14, 1916. Serial No. 72,063.

*To all whom it may concern:*

Be it known that I, JOSIAH SCOTT, a citizen of the United States, and a resident of Toledo, in the county of Lucas and State of Ohio, have invented a certain new and useful Wind-Shield Wiper; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to wipers for windshields, and has for its object the provision of a simple, improved and inexpensive device of this character which is capable of being easily and quickly attached to or removed from operative engagement with a windshield, or of being carried in inoperative position by the windshield.

Further objects and advantages of the invention will be apparent to persons skilled in the art.

The invention is fully described in the following specification, and while, in its broader aspect, it is capable of embodiment in numerous forms, a preferred embodiment thereof is illustrated in the accompanying drawings, in which,—

Figure 1 is a perspective view of the device attached to a windshield and in inoperative position with respect thereto. Fig. 2 is a similar enlarged view thereof. Fig. 3 is a perspective view of the wiper in lowered pendant relation to the upper edge of the windshield, and Fig. 4 is a view of the wiper removed from the windshield.

The present embodiment of my invention comprises a heavy wire of spring material, preferably metal, which is bent in U-shape to form the opposed parallel leg portions 1, 1 and the crown or looped portion 2, connecting the inner ends of the legs. The crown portion 2 is transversely offset from the leg portions 1, 1 by a transverse bending of the inner ends of the leg portions, as at 3, 3, as shown. The knee portions 4, 4 at the point of connection of the crown portion with the respective transversely extending leg portions 3, 3, are drawn slightly inward to restrict the space between said knee portions with respect to the width of the crown portion, and also with respect to the space between the body portion of the parts 3, 3. The restricting of the spacing between the knee portions 4, 4 of the legs of the device in this manner enables the portions 3, 3 to embrace opposite sides of a windshield frame 5 in transverse relation thereto when the legs 1, 1 are disposed in adjacent parallel relation to the inner edge of the windshield frame, as shown in Figs. 1 and 2, and to yieldingly coöperate with the frame to retain the device in such inoperative position. When the leg portions 1, 1 are swung downward to impart a glass wiping movement thereto, with one leg at each side of the glass 6 of the shield, the knees 4, 4 spring outward as they are drawn across the frame 5 transversely thereof and the crown portion 3 rests on the frame and serves as the swinging fulcrum for the cleaner.

The free ends of the legs 1, 1 are preferably flared outward, as at 7, to facilitate a forcing of the device over the frame 5 when being placed in engagement with a windshield. The flaring or outward turning of the leg ends in this manner also provides a hand-hold to facilitate a springing of the device in cleaning engagement with the windshield, either leg end being grasped, depending on which is at the side of the windshield adjacent to the operator.

The leg or wiper portions 1, 1 of the device are covered with a suitable wiping material 8, such, for instance, as felt, rubber tubing, or the like.

It is evident that when the wiper is in the inoperative position shown in Figs. 1 and 2, the inner transversely extending portions 3, 3 of the wiper legs will have yielding, embracing and holding engagement with the frame of the windshield in transverse relation thereto, and the wiper legs 1 will be disposed in parallel substantially coacting relation with the inner edge of the frame, while the crown portion 2 of the wiper extends in the opposite direction from the frame embracing parts 3, 3 to the legs 1 and has fulcrum coaction with the outer edge of the frame to facilitate a downward swinging of the wiper from holding engagement with the frame. The inward springing tendency of the legs 1, 1 causes the legs to have yielding opposed gripping coaction with the windshield glass to facilitate a cleaning of both sides thereof when the legs are swung in engagement with the glass.

I wish it understood that my invention is not limited to any specific construction, arrangement or form of the parts, as it is capable of numerous modifications without departing from the spirit of the claims.

Having thus described my invention, what I claim as new, and desire to secure by Letters Patent, is,—

1. A wiper of the class described having opposed wiper legs, a crown portion transversely offset from said legs, and portions connecting said crown and respective leg portions and serving to yieldingly embrace the frame of a windshield when the wiper is in one position of its movement with respect to the windshield.

2. A wiper of the class described formed in U-shape from spring material and having its crown portion connected to the inner ends of the respective leg portions by transversely extending yieldingly spaced frame embracing portions.

3. A wiper of the class described having opposed leg portions for wiping engagement with opposite sides of a windshield glass, and a crown portion connected to the respective legs through intermediate transversely disposed frame embracing portions, said crown portion being of spring nature to resist an outward springing of the leg portions, and wiper parts carried by said leg portions.

4. A wiper of the class described formed of spring wire doubled upon itself and forming opposed glass wiping leg portions and an L-form crown portion, with the space between the knees of the crown portion restricted, and a wiping material carried by said leg portions.

5. A wiper of the class described, comprising a wire bent in U-shape and having parallel leg portions for coacting with opposite sides of a windshield glass, an offset crown portion for fulcruming on the outer edge of a windshield frame, and frame embracing portions connecting said crown and leg portions and disposed transversely thereof, the free ends of the leg portions being bent outward.

6. A wiper of the class described having a wiper leg for wiper contact with a windshield glass, and a looped part at one end of said leg for embracing the glass holding edge portion of a windshield frame and coöperating therewith to yieldingly retain the wiper leg in substantially parallel relation to the frame edge to which attached.

7. A wiper of the class described having a wiper leg, and an L-shaped looped part at one end of said leg for embracing the glass holding portion of a windshield frame and coöperating therewith to yieldingly retain the wiper leg in substantially parallel relation to the frame edge to which attached and to serve as a fulcrum for the wiping movements of the wiper leg.

In testimony whereof, I have hereunto signed my name to this specification.

JOSIAH SCOTT.